United States Patent [19]

McDonald et al.

[11] Patent Number: 5,982,987
[45] Date of Patent: Nov. 9, 1999

[54] SOLID STATE THERMOSTAT

[76] Inventors: Donald E. McDonald, 850 E. St., Cassville, N.Y. 13318; Robert J. Lockhart, 164 Winthrop Rd., Deep River, Conn. 06417

[21] Appl. No.: 08/846,276

[22] Filed: Apr. 30, 1997

[51] Int. Cl.[6] .................................................. F24H 1/18
[52] U.S. Cl. ............................................ 392/449; 219/544
[58] Field of Search ............................ 392/449; 219/488, 219/490, 494; 236/91 F; 359/142, 147; 341/176

[56] References Cited

U.S. PATENT DOCUMENTS

| | | |
|---|---|---|
| 3,973,102 | 8/1976 | Macklen . |
| 3,973,147 | 8/1976 | Yu ............................................ 307/310 |
| 4,235,368 | 11/1980 | Neel . |
| 4,264,034 | 4/1981 | Hyltin et al. . |
| 4,298,946 | 11/1981 | Hartsell et al. . |
| 4,335,847 | 6/1982 | Levine . |
| 4,386,649 | 6/1983 | Hines et al. . |
| 4,388,692 | 6/1983 | Jones et al. . |
| 4,413,775 | 11/1983 | Scott . |
| 4,421,270 | 12/1983 | Raleigh et al. . |
| 4,428,528 | 1/1984 | Renault . |
| 4,460,125 | 7/1984 | Barker et al. . |
| 4,508,261 | 4/1985 | Blank . |
| 4,535,931 | 8/1985 | Bartok et al. . |
| 4,549,527 | 10/1985 | Davis . |
| 4,562,956 | 1/1986 | Check . |
| 4,599,992 | 7/1986 | Harding . |
| 4,621,336 | 11/1986 | Brown . |
| 4,639,709 | 1/1987 | Koet . |
| 4,641,778 | 2/1987 | Dodson . |
| 4,671,459 | 6/1987 | Stapensea . |
| 4,737,615 | 4/1988 | Stipe . |
| 4,751,961 | 6/1988 | Levine et al. . |
| 5,023,432 | 6/1991 | Boykin et al. . |
| 5,025,134 | 6/1991 | Bensoussan et al. . |
| 5,056,712 | 10/1991 | Enck . |
| 5,103,078 | 4/1992 | Boykin et al. . |
| 5,161,606 | 11/1992 | Berkeley et al. . |
| 5,197,665 | 3/1993 | Jenson et al. . |
| 5,203,497 | 4/1993 | Ratz et al. . |
| 5,244,146 | 9/1993 | Jefferson et al. . |
| 5,244,649 | 9/1993 | Brown et al. . |
| 5,304,781 | 4/1994 | Stalsberg . |
| 5,308,957 | 5/1994 | Huffington . |
| 5,329,991 | 7/1994 | Mehta et al. . |
| 5,332,884 | 7/1994 | Bailey . |
| 5,460,327 | 10/1995 | Hill et al. . |
| 5,467,921 | 11/1995 | Shreeve et al. . |

*Primary Examiner*—Teresa Walberg
*Assistant Examiner*—Thor Campbell
*Attorney, Agent, or Firm*—Bachman & Lapointe P.C.

[57] ABSTRACT

An apparatus for controlling a heat source of a hot water system includes a power circuit for selectively providing power to the heat source, the power circuit having an ON state wherein power is provided to the heat source and an OFF state wherein power is not provided to the heat source; a sensor for sensing water temperature of water in the hot water system and for operating the power circuit in the ON state when the water temperature is below a set desired temperature; and elements, operatively associated with the power circuit for modulating the power circuit whereby overshoot of the water temperature above the set desired temperature is inhibited.

20 Claims, 3 Drawing Sheets

SOLID STATE THERMOSTAT

BACKGROUND OF THE INVENTION

The invention relates to a solid state thermostat and control apparatus, especially for hot water heaters and water heating systems.

Conventional temperature controls for water heaters have been utilized for controlling the heating of water in residential and commercial heaters utilized for heating water and storing the heated water in both commercial and residential sites. Conventional controls typically use electromechanical devices which, although functional, are subject to mechanical failure.

A further limitation on conventional water heater systems is the tendency to overheat water to a temperature beyond the desired temperature, thereby entailing the use of additional energy.

In accordance with the foregoing, it is clear that the need remains for a water heater thermostat and controller which addresses the foregoing disadvantages.

It is therefore the primary object of the present invention to provide an apparatus for controlling the heating of a hot water system to avoid over heating water to a temperature above the desired temperature.

It is another object of the present invention to provide an apparatus for controlling a water heater system which avoids the mechanical failure problems commonly associated with electromechanical devices.

It is still another object of the present invention to provide a control apparatus which can be used to remotely turn off the heating element of a hot water heater when hot water is not needed.

A further object of the present invention is to provide a controller for a hot water system which includes safety features responsive to overheating and temperature detector failure.

Other objects and advantages will appear hereinbelow.

SUMMARY OF THE INVENTION

In accordance with the present invention, an apparatus for controlling a heat source of a hot water system is provided which comprises: power circuit means for selectively providing power to said heat source, said means having an ON state wherein power is provided to said heat source and an OFF state wherein power is not provided to said heat source; means for sensing water temperature of water in said hot water system and for operating said power circuit means in said ON state when said water temperature is below a set desired temperature; and means, operatively associated with said power circuit means, for modulating said power circuit means wherein overshoot of said water temperature above said set desired temperature is inhibited.

Still further according to the invention, an apparatus is provided which preferably further includes means for remotely controlling the means for sensing to operate the power circuit means in the OFF state.

In accordance with a further aspect of the present invention, the apparatus may preferably include over temperature shut down means for operating the power circuit means in the OFF state when surrounding temperature exceeds a specified safe temperature.

In accordance with still another aspect of the present invention, the apparatus may preferably include control means having a power input, a power output connected to the means for sensing, a sensing amp for receiving input from the means for sensing, a gating output for issuing control signals to the power circuit means, and a voltage circuit for providing voltage at the gating output to operate the power circuit means in an appropriate state.

BRIEF DESCRIPTION OF DRAWINGS

A detailed description of preferred embodiments of the invention follows, with reference to the attached drawings, wherein.

DETAILED DESCRIPTION

The invention relates to a controller for hot water systems, and especially to a thermostat and controller for electric heating of water in business, domestic and residential systems.

Figure 1:
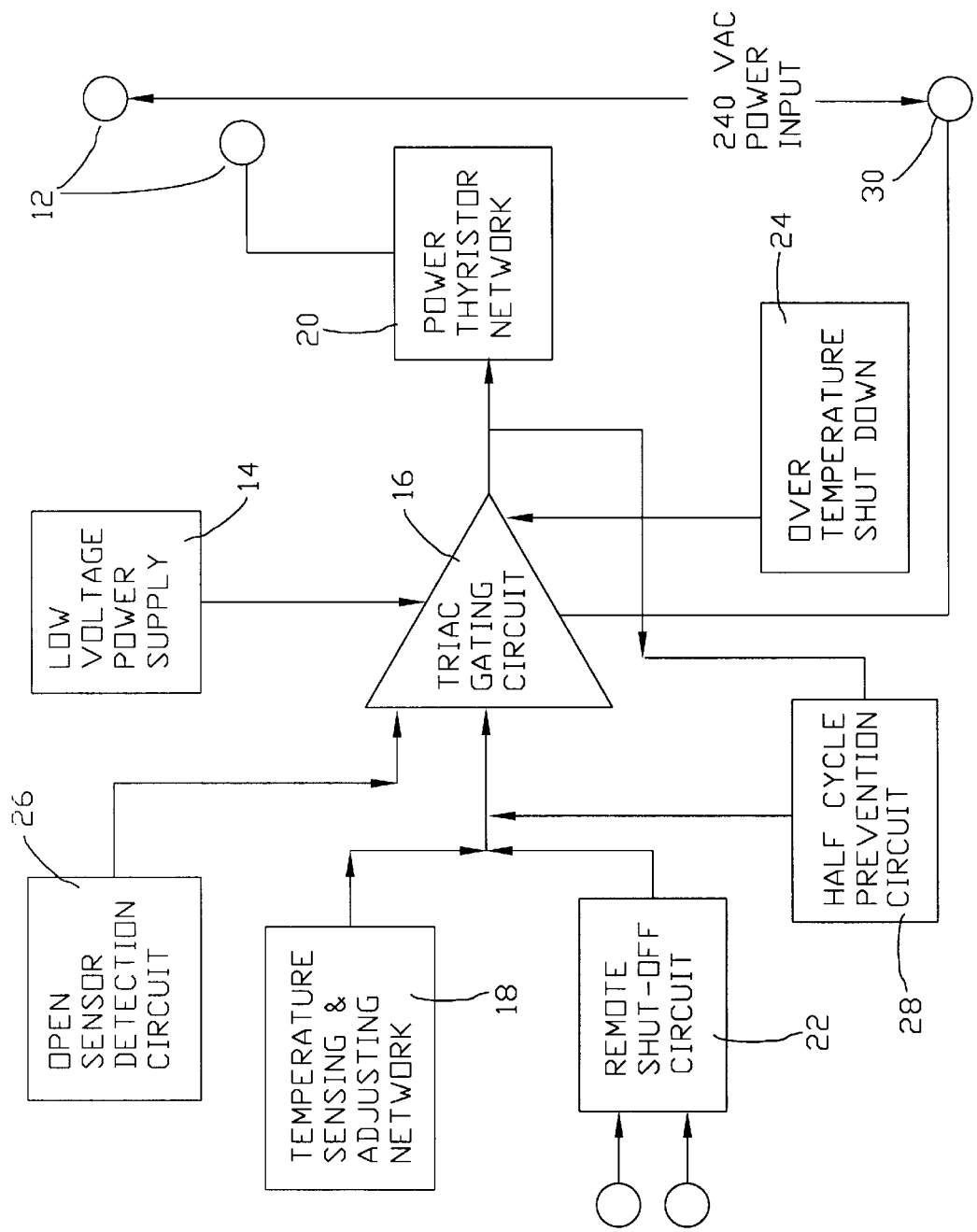
FIG. 1 is a block diagram of an apparatus in accordance with the present invention.

Referring to the drawings, FIG. 1 illustrates a block diagram of an apparatus 10 in accordance with the present invention. As shown, apparatus 10 is preferably connected to a water heater element 12 for controlling same in accordance with the present invention. Apparatus 10 preferably includes a low voltage power supply unit 14, a triac gating circuit 16, a temperature sensing and adjusting network 18 and a power thyristor network 20 each as will be further discussed below. In accordance with preferred embodiments of the invention, apparatus 10 may further include remote shut off circuit 22, an over temperature shut down unit 24, an open sensor detection circuit 26 and a half cycle prevention circuit 28.

Low voltage power supply 14 is provided in accordance with the invention and preferably connected to a source of power which may be common to the power source for water heater element 12, and which is typically in the range of about 240V AC. Low voltage power supply 14 serves in accordance with the invention to convert 240V AC preferably to a voltage of less than or equal to about 10V AC, and supplies this reduced voltage to the rest of apparatus 10, for example through triac gating circuit 16 as shown in FIG. 1.

Triac gating circuit 16 in accordance with the invention serves to receive input from temperature sensing and adjusting network 18 and, based thereupon, provide output to power thyristor network 20 for operating the water heater element 12 as desired. Triac gating circuit 16, as will be discussed below, may preferably include a zero crossing switch for responding to various input to provide the desired output to power thyristor network 20, and preferably further includes a converter to convert incoming 10V AC power to a DC current for the remaining elements of apparatus 10 in accordance with the invention.

Temperature sensing and adjusting network 18 preferably includes a temperature sensing element for determining the temperature of water being heated by water heater element 12, and is adapted to deliver input to triac gating circuit 16 which indicates whether the temperature reflected by temperature sensing and adjusting network 18 is less than a desired temperature of water to be heated. Depending upon the input provided from temperature sensing and adjusting network 18 to triac gating circuit 16, power thyristor network 20 as will be discussed below is operated in either an ON state or an OFF state so as to operate water heater element 12 when needed to obtain and maintain the desired water temperature, preferably without temperature overshoot as will be discussed.

Power thyristor network 20 is preferably connected to receive input from triac gating circuit 16, and is positioned between common 30 and an input to water heater element 12. Power thyristor network 20 is preferably a solid state device which is gated by triac gating circuit 16 between operation in an ON state wherein power is delivered to water heater element 12 for heating water as desired, and an OFF state wherein power is not delivered to water heater element 12.

In accordance with a preferred embodiment of the invention, apparatus 10 may preferably be provided with a remote shut off circuit 22 as described above whereby a remote and typically low voltage signal can be used to stop power supply to water heater element 12, preferably by overriding temperature sensing and adjusting network 18 and causing triac gating circuit 16 to gate power thyristor network 20 into operation in the OFF state. This feature of the preferred embodiment of the present invention is clearly advantageous in that the potentially high cost of operating the water heater system when hot water is not needed can readily be avoided.

Still referring to FIG. 1, apparatus 10 preferably further includes over temperature shut down unit 24 as described above, which is adapted in accordance with the invention to provide input to triac gating circuit 16 which causes triac gating circuit 16 to operate power thyristor network 20 in the OFF state when the temperature to which unit 24 is exposed exceeds a preselected safe temperature, for example a temperature greater than or equal to about 80° C.

In further accordance with a preferred embodiment of the present invention, apparatus 10 preferably includes open sensor detection circuit 26 as discussed above. Open sensor detection circuit 26 serves to provide triac gating circuit 16 with input which is indicative of a failed element in temperature sensing and adjustment network 18 which signal causes triac gating circuit 16 to operate power thyristor network 20 in the OFF state, thereby enhancing safety of use of apparatus 10 in accordance with the present invention. In further accordance with the invention, temperature sensing and adjusting network 18 and open sensor detection circuit 26 are preferably further adapted in accordance with the invention to provide input to triac gating circuit 16 which is indicative of a short in temperature sensing and adjusting network 18 also to cause triac gating circuit 16 to operate power thyristor network 20 in the OFF state.

Apparatus 10 may also be provided with half cycle prevention circuit 28 for periodically adding energy to triac gating circuit 16 to avoid problems caused by "half cycling" as will be further discussed below.

As set forth above, a significant advantage of the present invention is the avoidance of temperature overshoot during heating of water to a desired temperature. In this regard, temperature sensing and adjusting network 18 and power thyristor network 20 include structure for modulating power thyristor network 20 so as to temporarily and periodically operate power thyristor network 20 in the OFF state even though the desired water temperature has not yet been reached. In this way, apparatus 10 operates to gradually heat water to the desired temperature while substantially inhibiting the chance of overshoot of the desired water temperature. In accordance with the invention, water heating is modulated by providing apparatus 10 with a heat generating circuit, preferably a portion of power thyristor network 20, which generates heat during operation in the ON state. According to the invention, temperature sensing and adjusting network 18 is positioned in thermal communication with the heat generating circuit such that temperature sensing and adjusting network 18 is exposed to heat generated thereby.

Figure 3:
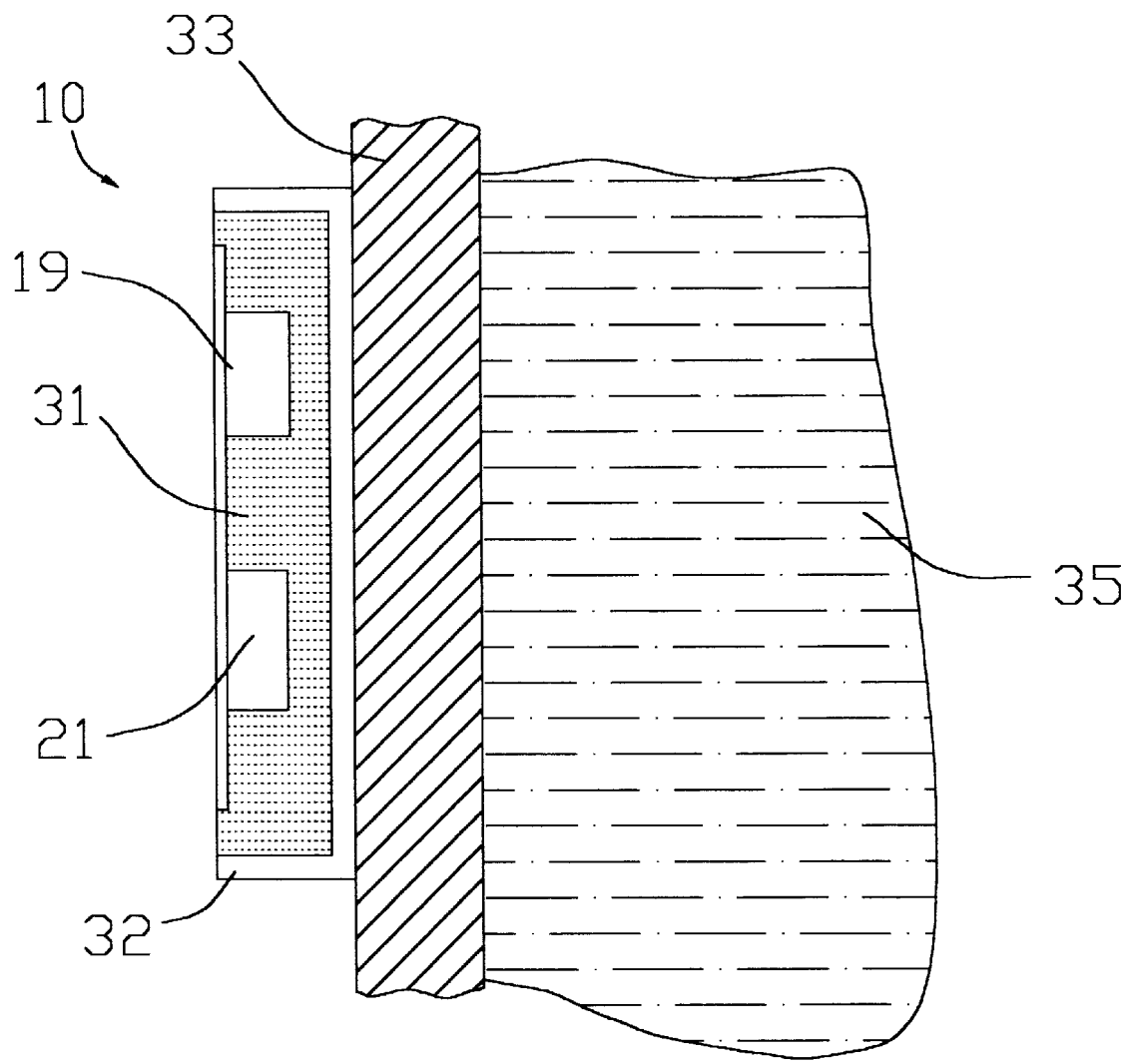
FIG. 3 schematically illustrates another aspect of an apparatus in accordance with the present invention.

Referring to FIG. 3, these elements, for example a temperature sensitive portion 19 of temperature sensing and adjusting network 18 and a heat generating portion 21 of power thyristor network 20 are mounted, preferably embedded, in a thermally conductive material preferably having a thermal conductivity of at least about 7 (BTU)(in)/(hr)(ft$^2$) (° F.). FIG. 3 shows these elements positioned together and encapsulated in thermally conductive material 31 within a housing 32 also preferably of suitable material such aluminum. Housing 32 may suitably be mounted to a wall of tank 33 as shown so as to expose temperature sensing and adjusting network 18 to the temperature of water 35 in tank 33. The provision of a heat generating portion of power thyristor network 20 in thermal communication with a temperature sensitive element of temperature sensing and adjusting network 18 advantageously serves to expose temperature sensing and adjusting network 18 to an increased temperature during heating of water with water heater element 12 so as to intermittently stop power to water heater element 12 while heat from the heat generating circuit of power thyristor network 20 is dissipated sufficiently that temperature sensing and adjusting network 18 again causes triac gating circuit 16 to operate power thyristor network 20 in the ON state. This advantageously serves to inhibit or avoid overheating of water with water heater element 12 to a temperature which is higher than the desired temperature.

Figure 2:
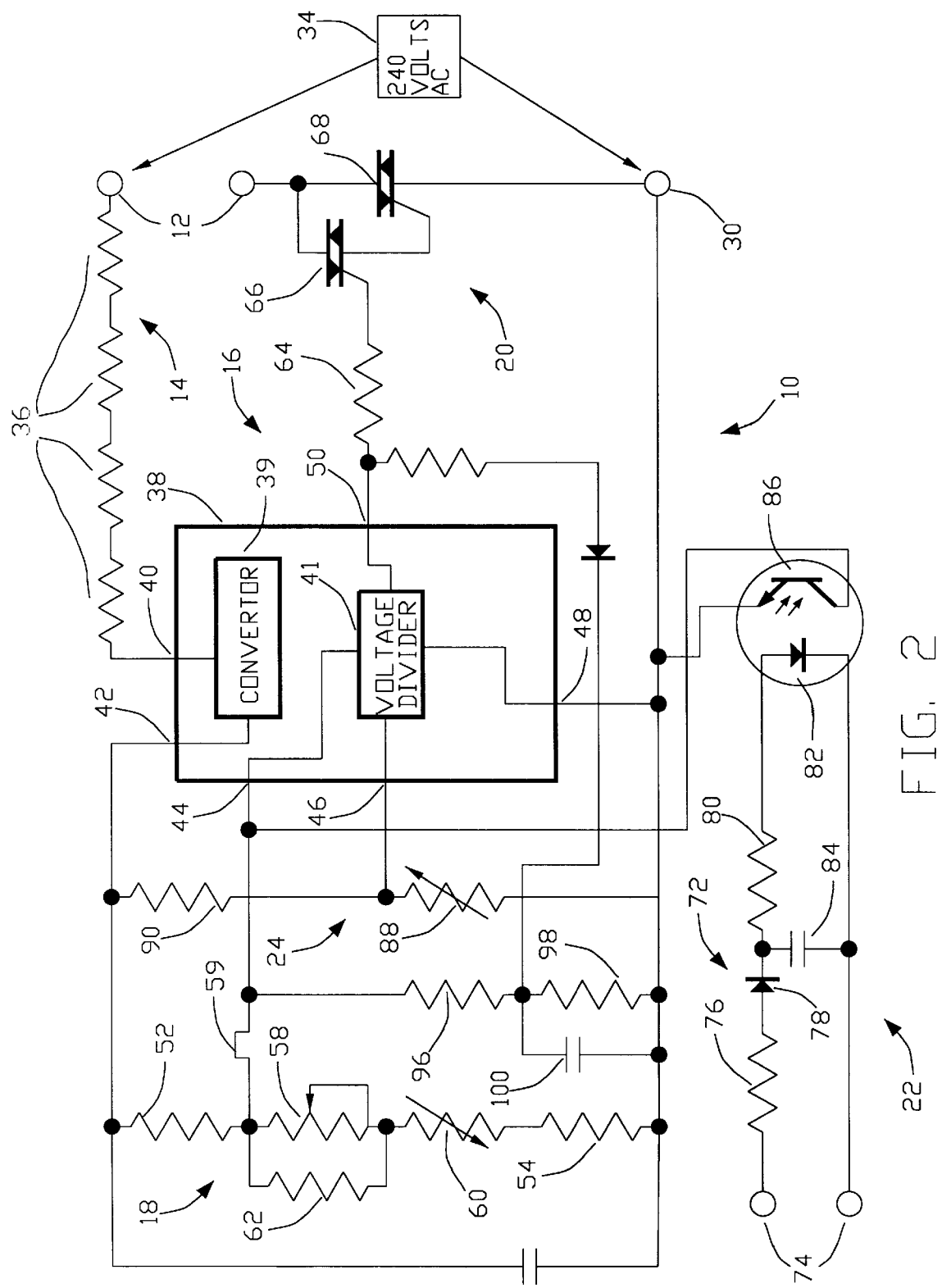
FIG. 2 is a schematic diagram of an apparatus in accordance with the present invention.

Referring now to FIG. 2, a schematic diagram of an apparatus 10 in accordance with the present invention is further illustrated and discussed. FIG. 2 shows apparatus 10 connected to one side of a source 34 of power, typically at 240V AC, and connected to common 30, and interposed between common 30 and water heater element or load 12. Apparatus 10 draws power from power source 34 through a series of resistors 36, as shown in FIG. 2, for reducing 240V AC from power source 34 to a level acceptable for apparatus 10, preferably less than or equal to about 10V AC.

A zero crossing switch 38 is provided preferably having an AC input 40 for receiving reduced power from resistors 36. Zero crossing switch 38 preferably includes a convertor 39 for converting AC to DC, and has a DC output 42 for powering various other elements of apparatus 10 in accordance with the invention. The convertor 39 of zero crossing switch 38 is preferably adapted to provide approximately 6.5V DC to all components of apparatus 10. Zero crossing switch 38 preferably further includes a sensing amp or input 44 for receiving voltage from elements of temperature sensing and adjusting network 18, remote shut off circuit 22 and other elements of apparatus 10 as will be further discussed below. An inhibit amp or sensor 46 is also provided for receiving input from elements of over temperature shut down unit 24, also as will be discussed below, and zero crossing switch 38 has a common input 48 for providing a reference to zero crossing switch 38. Finally, zero crossing switch 38 is also preferably provided with a gating output or amplifier 50 through which gating signals or voltages are sent to elements of power thyristor network 20 for operating network 20 in the desired ON and OFF states.

Zero crossing switch 38 preferably further includes an internal voltage divider 41 which cooperates with temperature sensing and adjusting network 18 so as to generate the appropriate output at gating output 50 for controlling power thyristor network 20 as desired. This portion of zero crossing switch 38, and cooperating elements of apparatus 10, provide the desired triac gating function of the present invention.

The temperature sensing and adjusting function of the present invention is preferably provided by a voltage divider circuit including a resistor 52 connected to DC output 42 and fixed balance resistor 54. Positioned in series with fixed balance resistor 54 is a temperature adjustable potentiometer 58 for use in setting a desired water temperature to which water is to be heated, and a negative temperature coefficient (NTC) thermistor 60. NTC thermistor 60 has a resistance which changes with temperature so as to balance an increase in potentiometer resistance when water temperature reaches the desired level. Typically, thermistors are non-linear devices. Thus, in order to provide the temperature adjustment feature of apparatus 10 with a substantially linear feel, the potentiometer is preferably parallelled with a resistor 62 which makes potentiometer 58 also non-linear, but in an opposite direction with respect to thermistor 60. This results in a temperature selection dial or other structure which is substantially linear in nature. It is preferred that both potentiometer 58 and thermistor 60 be located on the low voltage side of apparatus 10 as shown such that the impedance of the series network is the same over the anticipated temperature range. In other words, as the resistance of potentiometer 58 is increased, it takes substantially exactly the same amount of resistance change of the thermistor to balance voltage to sensing amp 44.

The voltage divider network of the temperature sensing and adjusting network 18 is also preferably connected to sensing amp 44 of zero crossing switch 38, for example by lead 59 as shown, such that the level of voltage in the voltage divider network is input to the triac gating circuitry of zero crossing switch 38 as desired.

Power thyristor network 20 preferably includes a logic triac 66 connected to gating output 50 of zero crossing switch 38, preferably through current limiting resistor 64, and also includes an SCR thyristor 68 connected between common 30 and one contact of water heater element 12. Logic triac 66 and SCR thyristor 68 are preferably arranged and adapted such that voltage from gating output 50 corresponding to an imbalance in the voltage divider network of temperature sensing and adjusting network 18 results in operation of SCR thyristor 68 in an "ON" state wherein power is provided to water heater element 12. Furthermore, when voltage in the voltage divider circuitry of network 18 is balanced, voltage from gating output 50 results in operation of SCR thyristor 68 in an "OFF" state, thereby disabling water heater element 12.

Referring again to FIG. 3, at least some elements of temperature sensing and adjusting network 18 and power thyristor network 20 are preferably mounted together in a thermally communicating relationship, preferably mounted or embedded in a thermally conductive material. As set forth above, a significant advantage of the present invention is a modulation of the heating process such that water is not heated continuously to a temperature which overshoots the desired temperature, thereby resulting in wasted energy or unsafe temperature. Positioning elements of temperature sensing and adjusting network 18, especially a heat sensitive member 19 such as NTC thermistor 60, in thermal communication with a heat generating circuit 21 such as SCR thyristor 68 advantageously provides this function in that SCR thyristor 68 gives off heat when operating in the "ON" state. Thus, while water is heated, additional heat is generated within housing 32 to which NTC thyristor 60 is exposed. This additional heat causes a temporary balance of voltage in the voltage divider network of temperature sensing and adjusting network 18, thereby causing zero crossing switch 38 to temporarily operate power thyristor network 20 in the "OFF" state, thereby disabling water heater element 12 while heat dissipates from housing 32. As the additional heat from power thyristor network 20 dissipates, voltage in the voltage divider network of network 18 becomes once again unbalanced, and zero crossing switch 38 again gates power thyristor network 20 into the "ON" state for operating water heater element 12. In this way, water is gradually heated through the last portion of the heating cycle to approach the desired temperature, thereby inhibiting any chance of temperature overshoot and providing a more efficient and safe heating operation.

FIG. 2 also shows remote shut off circuit 22 having a low voltage circuit 72 having contacts 74 which are connected by resistor 76, diode 78, resistor 80 and light emitting diode (LED) 82. Capacitor 84 is preferably provided in parallel with LED 82. Provision of low voltage circuit 72 as shown allows a low AC or DC voltage to be applied across contacts 74 so as to energize LED 82, which provides a desired shut off of apparatus 10 as will be discussed further. According to the invention, remote shut off circuit 22 also preferably includes an optotransistor 86 operatively associated with LED 82 such that light from LED 82 closes optotransistor 86, thereby connecting sensing amp 44 of zero crossing switch 38 to common 30 and causing zero crossing switch 38 to gate power thyristor network 20 into operation in the "OFF" state. Thus, by applying a low AC or DC voltage across contacts 74, which of course can be positioned remotely in a convenient location, apparatus 10 can be used to turn off the relatively high power consuming apparatus for heating water in a hot water system, most advantageously when hot water will not be needed for a substantial time. This remote control may be associated with home operating systems or networks, security systems, and the like if desired.

FIG. 2 also shows elements of over temperature shut down unit 24 including a positive temperature coefficient (PTC) thermistor 88 connected through a resistor 90 to DC output 42 of zero crossing switch 38. Over temperature shut down unit 24 also preferably includes a branch connection from the input to PTC thermistor 88 to inhibit amp 46 of zero crossing switch 38. According to the invention, PTC thermistor 88 is preferably provided or adapted such that the resistance of PTC thermistor increases dramatically at a particular desired maximum safe temperature, for example about 80° C. When the threshold temperature is reached, PTC thermistor 88 dramatically increases in resistance and, with the help of resistor 90, produces a voltage that inhibits amp 46 which causes zero crossing switch 38 to gate power thyristor network 20 into the OFF state, thereby shutting down water heater element 12 until the surrounding temperature returns to a safe temperature below the threshold temperature of PTC thermistor 88. Thus, and advantageously, apparatus 10 includes built in solid-state over-temperature protection, thereby greatly enhancing safety of use of apparatus 10 with a hot water system.

It should also be noted that the above-mentioned elements of temperature sensing and adjusting network 18 provide for an open sensor detection function whereby power thyristor network 20 is gated to an OFF state if NTC thermistor 60 fails in either an open state calling for maximum heat or a short circuited state.

Still referring to FIG. 2, half cycle prevention circuit 28 preferably includes a circuit connected between gating output 50 and sensing amp 44 and includes resistor 92, diode 94, resistors 96, 98 and capacitor 100. Half cycle prevention circuit 28 serves to draw energy from output 50 and, through capacitor 100 and resistors 96, 98, periodically add this energy to input at sensing amp 44 to prevent half cycling and ensure proper "ON" operation of apparatus 10 as and when desired.

The half cycle prevention circuit 28 in accordance with the present invention functions as follows. A thyristor driving signal which is a string of pulses is issued through output 50 from zero crossing switch 38. This driving signal is a string of pulses which occur at each zero crossing of the AC power source. The half cycle prevention circuit is a positive feedback from the thyristor driving signal. When the temperature sensing circuit senses cooler water, voltage at sensing amp 44 increases causing the comparator in zero crossing switch 38 to switch to an "ON" state. A small portion of the pulses from output 50 is fed through resistor 92 and diode 94 to the network formed by resistors 96, 98 and capacitor 100. This network gives the feedback energy a time component greater than one-half AC cycle. As a result, the voltage at the junction of diode 94, capacitor 100, resistor 96 and resistor 98 keeps getting pumped up with each pulse and looks like DC during the heating period. This voltage is added to the input voltage at sensing amp 44 causing the water to appear slightly cooler. This forces the sensing amp 44 out of a linear mode, thereby removing the chance of sensing amp 44 half cycling. This prevents half cycling because the pulse for the very first half cycle drives sensing amp 44 fully "ON", and stores it so that it must produce a pulse for the next half cycle. When the water has reached a satisfactory temperature, the pulse is stopped. With the loss of two consecutive pulses, the pump circuit voltage is lost, sense voltage at sensing amp 44 is pulled down making the water seem slightly warmer, and causing sensing amp 44 to be operated in a fully "OFF" condition.

During operation of apparatus 10, and still referring to FIG. 2, temperature adjustable potentiometer 58 is preferably adjusted to a desired temperature for water in the water system to which apparatus 10 is attached. Assuming that potentiometer 58 has been set to a temperature higher than the surrounding temperature of apparatus 10 and the water temperature to which apparatus 10 is exposed, potentiometer 58 has an increased resistance which is not balanced by NTC thermistor 60. This imbalance is represented by a higher voltage sensed by sensing amp 44 from lead 59. This voltage is passed through internal voltage divider 41 where it is compared to a determinate voltage determined based upon voltage input from convertor 39 and common input 48. A positive comparison of these voltages results in pulses to power thyristor network 20 as desired, and which gate logic triac 66 and SCR thyristor 68 selectively to an "ON" operating state wherein power is supplied to water heater element 12. As power is supplied and power thyristor network 20 operates in the ON state, internal heat is generated and thermistor 60 is exposed to this internal heat, as well as the increasing temperature of water being heated. This combined heat causes a decrease in the resistance of NTC thermistor 60 drawing down the voltage at sensing amp 44 until the increased resistance of potentiometer 58 is balanced by the decreased resistance in NTC thermistor 60, and a balanced voltage is provided at sensing amp 44 resulting in a different voltage from gating output 50 which gates power thyristor network 20 into operation in the "OFF" state wherein power is not supplied to water heater element 12. As heat generated by power thyristor network 20 dissipates through housing 32 (FIG. 3), thermistor 60 again falls to a temperature which provides a resistance that does not balance increased resistance of potentiometer 58. This results in a voltage at sensing amp 44 which again causes zero crossing switch 38 to gate power thyristor network 20 into the "ON" state. This sequence continues until surrounding water temperatures causes thermistor 60 and potentiometer 58 to reach a substantially balanced resistance, at which point the desired water temperature has been reached without overshoot and apparatus 10 gates power thyristor network 20 to the "OFF" state until additional heat is needed to maintain the desired water temperature or to reach a higher temperature called for by re-adjustment of potentiometer 58.

If it is desired to temporarily disable apparatus 10 and thereby temporarily stop water heater element 12 from heating water in the hot water system, a low voltage applied across contacts 74 of remote shut off circuit 22 serves to activate optotransistor 86 and thereby pull down sensing amp 44, which in turn holds gating output 50 in an OFF condition. In this regard, it should be noted that the components of low voltage circuit 72, specifically resistor 76, diode 78, resistor 80 and capacitor 84, serve to rectify AC input and allow DC voltages to pass, all as desired in accordance with the present invention.

During operation of apparatus 10, should the temperature of apparatus 10 and/or surrounding water exceed a safe level, such as for example 80° C., PTC thermistor 88 is influenced by this increase in temperature to rapidly increase in resistance. Due to resistor 90, a voltage is produced at inhibit amp 46 which shuts down triac gating circuit 16 until the temperature returns to a safe level. This advantageously serves to prevent damage to the components of apparatus 10, and also to prevent overheating of water in the tank.

In the event of failure of NTC thermistor 60, either in an open condition or a short-circuited condition, voltage levels provided to sensing amp 44 are sufficient to gate power thyristor network 20 to operation in the "OFF" state so as to enhance safety as desired.

In accordance with the foregoing, it should readily be appreciated that an apparatus has been provided which accomplishes each of the set forth objectives. It should also be noted that although the invention is described in terms of a load which is an electrical water heater element 12, the subject matter of the present invention could be adapted to other types of water heater elements including gas water heaters and the like.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

We claim:

1. An apparatus for controlling a heat source of a hot water system, comprising:

power circuit means for selectively providing power to said heat source, said means having an ON state wherein power is provided to said heat source and an OFF state wherein power is not provided to said heat source;

means for sensing water temperature of water in said hot water system and for operating said power circuit means in said ON state when said water temperature is below a set desired temperature; and means, operatively associated with said power circuit means, for modulating said power circuit means wherein overshoot of said water temperature above said set desired temperature is inhibited, wherein said means for modulating comprises a heat generating circuit positioned in thermal communication with said means for sensing water temperature and wherein said heat generating circuit and said means for sensing water temperature are encapsulated in a thermally conductive material, having a thermal conductivity of at least about 7 $(BTU)(in)/(hr)(ft^2)$ (° F.).

2. An apparatus according to claim 1, wherein said means for modulating comprises means for periodically operating said power circuit means in said OFF state while said water temperature is below said set desired temperature.

3. An apparatus according to claim 1, wherein said heat generating circuit is at least a portion of said power circuit means, and wherein said heat generating circuit generates heat when said power circuit means operates in said ON state.

4. An apparatus according to claim 1, wherein said means for sensing includes a temperature sensitive element and wherein said power circuit means includes a heat generating circuit, and wherein said means for modulating comprises said temperature sensitive element and said heat generating circuit positioned in thermal communication with said temperature sensitive element whereby heat from said heat generating circuit temporarily causes operation of said power circuit means in said OFF state.

5. An apparatus according to claim 1, wherein said means for sensing further comprises means for adjusting said set desired temperature.

6. An apparatus according to claim 1, wherein said means for sensing further comprises a voltage dividing network having an adjustable potentiometer and a temperature dependent thermistor arranged in series, means for sensing voltage in said network, and means for selectively operating said power circuit means in said ON state and said OFF state based upon said voltage in said network.

7. An apparatus according to claim 6, wherein said thermistor is non-linear, and wherein said network includes a resistance in parallel with said potentiometer so that said potentiometer is non-linear in an opposite direction with respect to said thermistor whereby temperature adjustment is substantially linear.

8. An apparatus according to claim 6, wherein said means for selectively operating comprises an internal voltage dividing circuit for providing a determinate voltage, and a comparison unit for comparing said voltage in said voltage dividing network to said determinate voltage.

9. An apparatus according to claim 8, wherein said means for selectively operating is adapted to operate said power circuit means in said OFF state when voltage in said voltage dividing network is indicative of said thermistor malfunctioning.

10. An apparatus according to claim 1, wherein said power circuit means comprises a power thyristor network having a logic triac and a thyristor, and further comprising triac gating means for operating said logic triac, said triac gating means being operatively associated with said means for sensing.

11. An apparatus according to claim 1, further comprising means for remotely controlling said means for sensing to operate said power circuit means in said OFF state.

12. An apparatus according to claim 11, wherein said means for remotely controlling comprises a low voltage circuit having a light emitting diode, and an optotransistor circuit having an optotransistor operatively associated with said light emitting diode and said means for sensing whereby application of voltage to said low voltage circuit causes said light emitting diode to emit light thereby activating said optotransistor and controlling said means for sensing to operate said power circuit means in said OFF state.

13. An apparatus according to claim 1, further comprising over temperature shut down means for operating said power circuit means in said OFF state when surrounding temperature exceeds a safe temperature.

14. An apparatus according to claim 13, wherein said over temperature shut down means comprises a shut down circuit including a thermistor operatively associated with said means for sensing for operating said power circuit means in said OFF state when said thermistor is exposed to temperatures above said safe temperature.

15. An apparatus according to claim 1, further comprising a half cycle prevention circuit connected to said means for sensing for substantially preventing half cycling at said means for sensing.

16. An apparatus according to claim 1, further comprising gating means having a power input, a power output connected to said means for sensing, a sensing amp for receiving input from said means for sensing, a gating output for issuing output to said power circuit means, and circuit means for adapting output to said power circuit means to selectively operate said power circuit means in said ON and OFF states.

17. An apparatus according to claim 1, further comprising an AC power inlet circuit communicated with said apparatus for providing said power circuit means and said means for sensing with a reduced voltage of less than or equal to about 10V AC.

18. An apparatus according to claim 17, further comprising a converter associated with said power inlet circuit for converting said reduced voltage to DC voltage.

19. An apparatus according to claim 1, wherein said power circuit means, said means for sensing and said means for modulating are solid state devices.

20. An apparatus for controlling a heat source of a hot water system, comprising:

power circuit means for selectively providing power to said heat source, said means having an ON state wherein power is provided to said heat source and an OFF state wherein power is not provided to said heat source;

means for sensing water temperature of water in said hot water system and for operating said power circuit means in said ON state when said water temperature is below a set desired temperature; and means, operatively associated with said power circuit means, for modulating said power circuit means wherein overshoot of said water temperature above said set desired temperature is inhibited; and means for remotely controlling said means for sensing to operate said power circuit means in said OFF state, wherein said means for remotely controlling comprises a low voltage circuit having a light emitting diode, and an optotransistor circuit having an optotransistor operatively associated with said light emitting diode and said means for sensing whereby application of voltage to said low voltage circuit causes said light emitting diode to emit light thereby activating said optotransistor and controlling said means for sensing to operate said power circuit means in said OFF state.

* * * * *